(12) United States Patent
Morris

(10) Patent No.: US 7,631,007 B2
(45) Date of Patent: Dec. 8, 2009

(54) SYSTEM AND METHOD FOR TRACKING USER ACTIVITY RELATED TO NETWORK RESOURCES USING A BROWSER

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 271 days.

(21) Appl. No.: 11/104,972

(22) Filed: Apr. 12, 2005

(65) Prior Publication Data

US 2006/0230058 A1 Oct. 12, 2006

(51) Int. Cl.
G06F 17/30 (2006.01)

(52) U.S. Cl. ............... 707/102; 707/2; 707/3; 707/8; 707/9; 707/10; 709/218; 709/219; 709/227; 709/228; 705/7; 705/10

(58) Field of Classification Search .......... 709/224, 709/218, 219, 227, 228; 707/2, 3, 8, 9, 10, 707/102; 705/10, 7
See application file for complete search history.

(56) References Cited

U.S. PATENT DOCUMENTS

| | | | | |
|---|---|---|---|---|
| 4,858,152 | A | | 8/1989 | Estes .................... 702/186 |
| 5,621,663 | A | | 4/1997 | Skagerling ............ 702/186 |
| 5,848,396 | A | * | 12/1998 | Gerace .................. 705/10 |
| 5,848,412 | A | | 12/1998 | Rowland et al. ........ 707/9 |
| 5,872,976 | A | | 2/1999 | Yee et al. ............. 717/127 |
| 6,018,619 | A | * | 1/2000 | Allard et al. .......... 709/224 |
| 6,035,332 | A | | 3/2000 | Ingrassia, Jr. et al. ... 709/224 |
| 6,070,190 | A | | 5/2000 | Reps et al. ........... 709/224 |
| 6,199,067 | B1 | | 3/2001 | Geller ................. 707/10 |
| 6,253,198 | B1 | | 6/2001 | Perkins | |
| 6,381,632 | B1 | | 4/2002 | Lowell ................. 709/203 |
| 6,393,407 | B1 | | 5/2002 | Middleton, III et al. ... 705/14 |
| 6,418,471 | B1 | | 7/2002 | Sheldon et al. | |
| 6,470,383 | B1 | * | 10/2002 | Leshem et al. ........ 709/223 |
| 6,489,968 | B1 | | 12/2002 | Ortega et al. ........ 715/713 |
| 6,505,201 | B1 | | 1/2003 | Haitsuka et al. ....... 707/10 |
| 6,681,247 | B1 | * | 1/2004 | Payton ................. 709/217 |
| 6,701,362 | B1 | * | 3/2004 | Subramonian et al. ... 709/224 |
| 6,711,557 | B1 | | 3/2004 | Palaniappan .......... 706/45 |

(Continued)

OTHER PUBLICATIONS

"Google Search," [online] Wikipedia.org [retrieved on Jan. 20, 2007] Retrieved from the Internet: <URL: http://en.wikipedia.org/wiki/Google_%28search_engine%29> 4 pages.

(Continued)

*Primary Examiner*—Isaac M Woo
*Assistant Examiner*—Syling Yen

(57) ABSTRACT

A method and system are described for tracking user activity related to network resources using a browser. According to an exemplary embodiment, a user-initiated activity related to a network resource is detected in the browser. The detected user-initiated activity is associated with the network resource to form an activity-resource pair. The activity-resource pair is associated with a record in a data store related to the detected activity or the network resource. By associating the activity-resource pair with records in the data store that relate to the network resource and/or the detected activity, the information in the data store can be used to add context to and provide insight into users' browsing activities.

38 Claims, 3 Drawing Sheets

U.S. PATENT DOCUMENTS

| | | | |
|---|---|---|---|
| 6,795,856 B1* | 9/2004 | Bunch | 709/224 |
| 6,813,248 B1 | 11/2004 | Boss et al. | 370/252 |
| 6,836,799 B1* | 12/2004 | Philyaw et al. | 709/224 |
| 6,839,680 B1* | 1/2005 | Liu et al. | 705/10 |
| 6,853,982 B2* | 2/2005 | Smith et al. | 705/27 |
| 7,062,475 B1* | 6/2006 | Szabo et al. | 706/11 |
| 2001/0003828 A1* | 6/2001 | Peterson et al. | 709/219 |
| 2002/0013834 A1* | 1/2002 | Esakov et al. | 709/223 |
| 2002/0029290 A1 | 3/2002 | Burema et al. | 709/238 |
| 2002/0065814 A1 | 5/2002 | Okamoto et al. | |
| 2002/0112048 A1* | 8/2002 | Gruyer et al. | 709/224 |
| 2002/0123988 A1 | 9/2002 | Dean et al. | 707/3 |
| 2002/0128925 A1* | 9/2002 | Angeles | 705/26 |
| 2002/0138487 A1 | 9/2002 | Weiss et al. | |
| 2002/0143861 A1 | 10/2002 | Greene et al. | |
| 2002/0156917 A1 | 10/2002 | Nye | |
| 2002/0198979 A1 | 12/2002 | Yu | 709/224 |
| 2003/0046409 A1* | 3/2003 | Graham | 709/229 |
| 2003/0115074 A1 | 6/2003 | Freeman et al. | 705/1 |
| 2003/0225614 A1* | 12/2003 | Rodriguez et al. | 705/14 |
| 2004/0034652 A1 | 2/2004 | Hofmann et al. | 707/102 |
| 2004/0054784 A1* | 3/2004 | Busch et al. | 709/228 |
| 2004/0073644 A1* | 4/2004 | Koch et al. | 709/223 |
| 2004/0098478 A1 | 5/2004 | Koetke et al. | |
| 2004/0098578 A1 | 5/2004 | Funayama | |
| 2004/0122811 A1 | 6/2004 | Page | 707/3 |
| 2004/0122943 A1 | 6/2004 | Error et al. | 709/224 |
| 2004/0199498 A1 | 10/2004 | Kapur et al. | |
| 2004/0249938 A1 | 12/2004 | Bunch | 709/224 |
| 2005/0240580 A1* | 10/2005 | Zamir et al. | 707/4 |
| 2006/0041562 A1* | 2/2006 | Paczkowski et al. | 707/10 |
| 2006/0218034 A1* | 9/2006 | Kelly | 705/11 |
| 2006/0224938 A1* | 10/2006 | Fikes et al. | 715/500 |

OTHER PUBLICATIONS

Austin, D., "How Google Finds Your Needle in the Web's Haystack," [online] Feature col. Copyright 2007 [retrieved on Jan. 1, 2007] Retrieved from the Internet: <URL: http://www.ams.org/featurecolumn/archive/pagerank.html> 10 pages.

"Index (Search Engine)" [online] Wikipedia.org [retrieved on Jan. 21, 2007] Retrieved from the Internet: <URL: http://en.wikipedia.org/wiki/Search_engine_indexing> 8 pages.

"Proximity Search (text)" [online] Wikipedia.org [retrieved on Jan. 21, 2007] Retrieved from the Internet: <URL: http://en.wikipedia.org/wiki/Proximity_search_%28text%29> 2 pages.

"Relevance (Information Retrieval)" [online] Wikipedia.org [retrieved on Jan. 21, 2007] Retrieved from the Internet: <URL: http://en.wikipedia.org/wiki/Relevance_%28information_retrieval%29> 1 page.

"Search Engine," [online] Wikipedia.org [retrieved on Jan. 21, 2007] Retrieved from the Internet: <URL: http://en.wikipedia.org/wiki/Search_engine> 5 pages.

"Web Crawler," [online] Wikipedia.org [retrieved on Jan. 21, 2007] Retrieved from the Internet: <URL: http://en.wikipedia.org/wiki/Web_crawling> 5 pages.

Morris, Robert P. System and Method for Generating a Search Index and Executing a Context-Sensitive Search, U.S. Appl. No. 11/022,133, filed Dec. 21, 2004.

http://labs.google.com/personalized/profile.html, 1 page.

Schlichting, D., "Full Text Search On Sql Server 2000," [online] Database Journal, Dec. 2, 2002 [retrieved Jun. 19, 2007] Retrieved from the Internet <URL: http://databasejournal.com/features/mssql/article.php/3441981>.

Goecks, J., "Learning Users' Interests By Unobrusively Observing Their Normal Behavior," Proceedings of the 2000 International Conference on Intelligent User Interfaces, Jan. 9-12, 2000, New Orleans, LA, USA, pp. 129-132 [online] Retrieved on Jun. 19, 2007, Retrieved from the Interent <URL:http://pages.cs.wisc.edu/~shavlik/abstracts/goecks.iui2000.abstracts.html> 4 pages.

* cited by examiner

US 7,631,007 B2

SYSTEM AND METHOD FOR TRACKING USER ACTIVITY RELATED TO NETWORK RESOURCES USING A BROWSER

CROSS-REFERENCE TO RELATED APPLICATIONS

The present application is related to co-pending U.S. patent application Ser. No. 11/022,133 (266/3326P) entitled "System and Method for Generating a Search Index and Executing a Context-Sensitive Search," filed on Dec. 21, 2004 and herein incorporated by reference in its entirety.

TECHNICAL FIELD

The present invention relates to tracking user activity during browsing, and more particularly to a system and method for tracking user activity related to network resources using a browser.

BACKGROUND

Methods for gathering usage statistics in document retrieval and browsing are well-known. A common scenario is for site owners, such as online retailers and online search services, to collect large amounts of information about user browsing activity. Typical solutions for analyzing browser session activity on a site are server-based. During a session between a user's browser and a server, the browser submits requests to the server to access content of a site, and the server may record each of the requests in some type of log. Each browser of a site is typically assigned an electronic identifier that permits the server to record the pages and links that a browser visits in the log. Site owners and advertisers may then use the visitor identification information to analyze usage activity of the site.

Another method for analyzing site usage data involves the use of cookies. A cookie is typically set on the user's computer by the site application while serving pages to the user's browser. The browser may then convey the cookie used to identify the user session as well as other information to an analytics engine upon the user making subsequent requests to the site.

Using the above methods, sites can currently count page hits, can classify hits from specific IP addresses or IP subnets, map addresses or subnets to geographic locales, and can count the rate of hits over given time intervals etc. For a particular site or family of sites, servers can track requests from a particular browser or address to detect browsing patterns. However, cookie blocking, cookie deletion, and changing IP addresses make it difficult for these methods to collect consistent and comprehensive data.

These methods have other disadvantages as well. For example, server gathered statistics encompass only a small slice of a user's actual behavior. The statistics are often specific to the context of the sites gathering the data and are thus not useful outside of the particular context of the site. Further, combining data gathered from several servers is difficult given that identifying users is often difficult due to cookie blocking, anti-spyware, and other privacy mechanisms.

Accordingly, what is needed is an improved system and method for tracking user activity related to network resources during browsing. The system and method should be capable of tracking both user-initiated activities related to network resources in the browser as well as any corresponding results received by the browser as a result of the activities that are not accessible by servers.

SUMMARY

A method and system are described for tracking user activity related to network resources using a browser. According to an exemplary embodiment, a user-initiated activity related to a network resource is detected in the browser. The detected user-initiated activity is associated with the network resource to form an activity-resource pair. The activity-resource pair is associated with a record in a data store related to the detected activity or the network resource. According to another exemplary embodiment, a client device is described for tracking user activity information related to network resources. The client device includes a browser for providing access to a network resource. A context/activity monitor is included in the browser to detect a user-initiated activity related to the network resource and for associating the user-initiated activity with the network resource to form an activity-resource pair. The context/activity monitor is configured to associate the activity-resource pair with a record included in the data store related to network resource or the detected activity.

DETAILED DESCRIPTION

The present invention relates to tracking user activity information related to network resources using a browser. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a system and method for tracking user activity information related to network resources during browsing. Rather than tracking user statistics from a server, the present invention provides browsers with components for detecting and tracking user-initiated activity in the browser as well as results of those activities that are not detectable through monitoring requests issued by the browser to a particular site or family of sites. The user context and activity data may then be sent to a server for uses including customizing searches and ranking search results initiated by the user, and combining the context and activity data of multiple users for marketing analysis.

Figure 1:
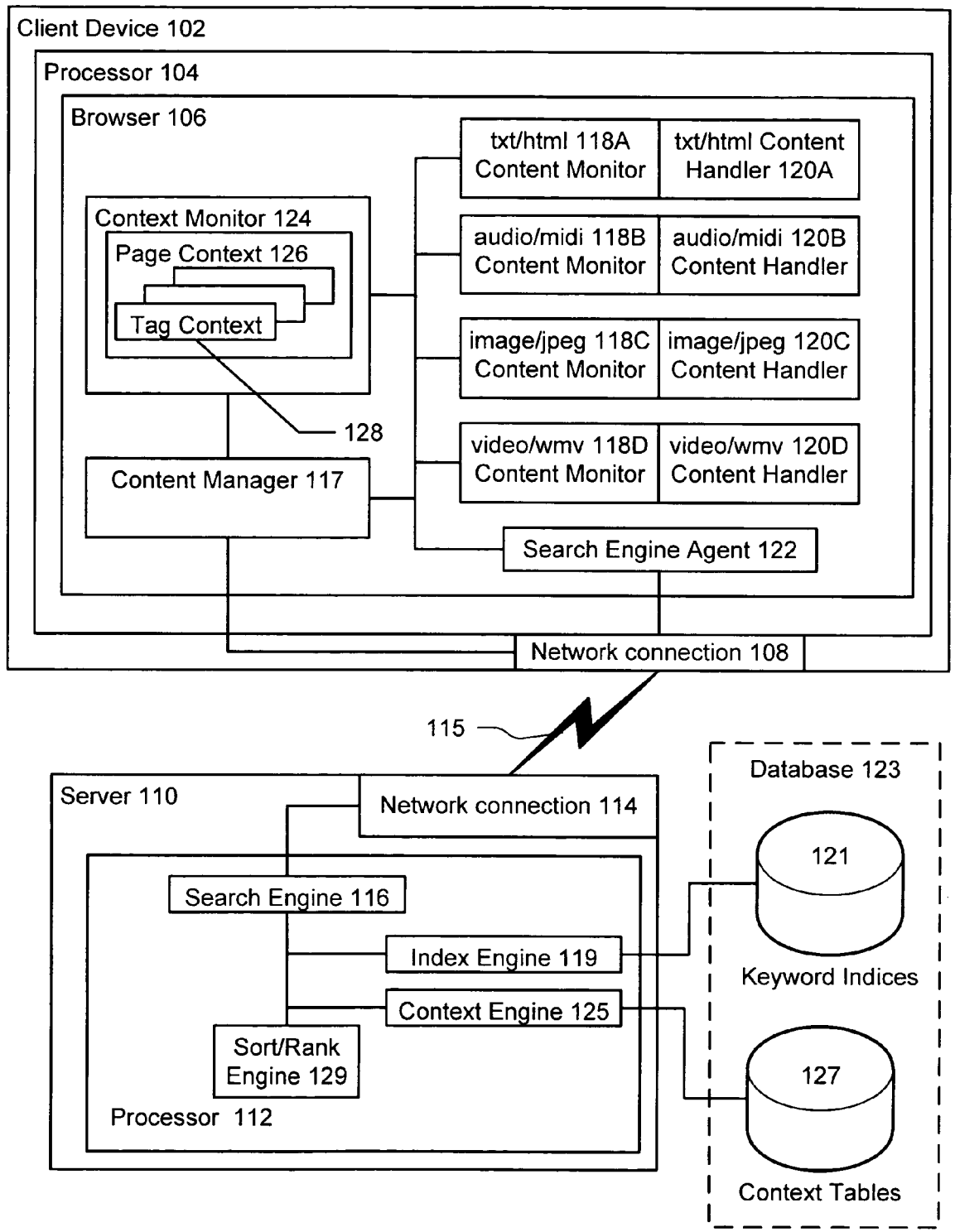
FIG. 1 is a block diagram illustrating one embodiment of a system for monitoring and recording content and contextual information related to network resources using a browser.

FIG. 1 is a block diagram illustrating one embodiment of a system 100 for monitoring and recording content and contextual information related to network resources using a browser. The system 100 includes a client device 102 operatively coupled to a server 110 over a network, such as the Internet.

The client device 102 may include a personal computer (PC), a personal digital assistant (PDA), a notebook, or any other device that includes a processor 104 capable of running a browser 106 that provides access to sites on the network via a network connection 108. The server 110 typically serves a site and is accessible by the browser 106 over the network, e.g., via a uniform resource locator (URL). The server 110 may comprise any type of computer or system with a processor 112 and a network connection 114.

During a session between the browser 106 and the server 110, user-initiated activities may cause the browser 106 to submit requests to the server 110 to access the content of a site. In response, the browser 106 receives network resources (or objects) from the server 110, which may include pages, music, text and graphic files, applets, and so on. Network resources available via the Internet are assigned a unique name referred to as a uniform resource identifier (URI). A URL is a particular type of URI that specifies a location of a resource on the network.

The browser 106 includes a conventional set of content handlers 120A through 120D (collectively referred to as content handlers 120) for parsing the data and, if necessary, presenting the various types of objects that the browser 106 receives, and a content manager 117 for routing incoming data to the correct content handler. For example, content handler 120A may be responsible for processing and displaying text and HTML objects; content handler 120B may be responsible for processing audio/midi objects; content handler 120C may be responsible for processing and displaying image objects; and content handler 120D may be responsible for processing video objects.

According to the preferred embodiment of the present invention, the browser 106 is further provided with components for enabling the browser 106 to index content retrieved by the browser 106 and to gather contextual information concerning the content that is not inherent in the content itself. The contextual information can be classified into two categories, user provided information which is information the user willingly provides about him/her self such as in a profile or preferences, and information detected based on the user's activities.

In one embodiment of the invention, the additional components added to the browser 106 for client-side gathering and indexing of content and contextual information related to network resources include a context monitor 124 coupled to the content manager 117, a set of one or more content monitors 118A through 118D (collectively referred to as content monitors 118) coupled between the content manager 117 and corresponding content handlers 120A, 120B, 120C, and 120D, and a search engine agent 122 coupled to the content monitors 118 for communicating with applications and/or servers that use the indexed content and contextual information.

According to the exemplary embodiment, the content monitors 118 and context monitor 124 parse the objects received by the browser 106 for both content information and contextual information associated with each object as described above. The content manager 117 is responsible for routing content to the appropriate content handlers 120 through any intervening content monitors 118 that record and index the content and any associated metadata from the received objects/pages. As used herein, content information includes information that is inherent to (or is directly related to) the object itself. Content information may include information about the object, such as its mime type (e.g., PDF, JPEG, or HTML), name, title, author, creation date, and subject of the object, and metadata associated with the object.

The context monitor 124 receives data from the content manager 117 and/or content monitors 118 and determines further contextual information by discovering the relationships among the content, object contextual information, and the objects handled by the content monitors 118. For example, for an HTML page the context monitor develops a page context 126 using information concerning page format and structure determining by the txt/html content monitor 118A to discover context concerning the objects included in or referred to by the page. For example, each tag in an HTML page contains contextual information 128 about its contents and the data arranged or received in the browser 106 before and/or after it.

Where the content monitors 118 gather and index the various content and associated metadata in the data stream that is routed from the content manager 117 to the corresponding content handlers 120, the context monitor 124 determines contextual relationships that exist among the various pieces of content included in the data stream. In contrast to content information, contextual information includes information that is not inherent to (or is secondary, additional or peripheral to) the object. Examples of contextual information related to a received object include objects received in the browser 106 before or after the object is received, attributes of other objects arranged near the received object in the browser 106, attributes of mark-up language tags that include the object, attributes of links to additional metadata associated with the object, attributes of a user of the browser 106, such as interests and other non-personal information, identifiers of other objects linked to the received object, and information indicating that the object's content information comes from a title or heading in the browser 106. In a preferred embodiment, an index may be created in the client device 102 for indexing the content and/or contextual information, and can either be stored in the client device 102 or transferred to server 110.

Figure 2:
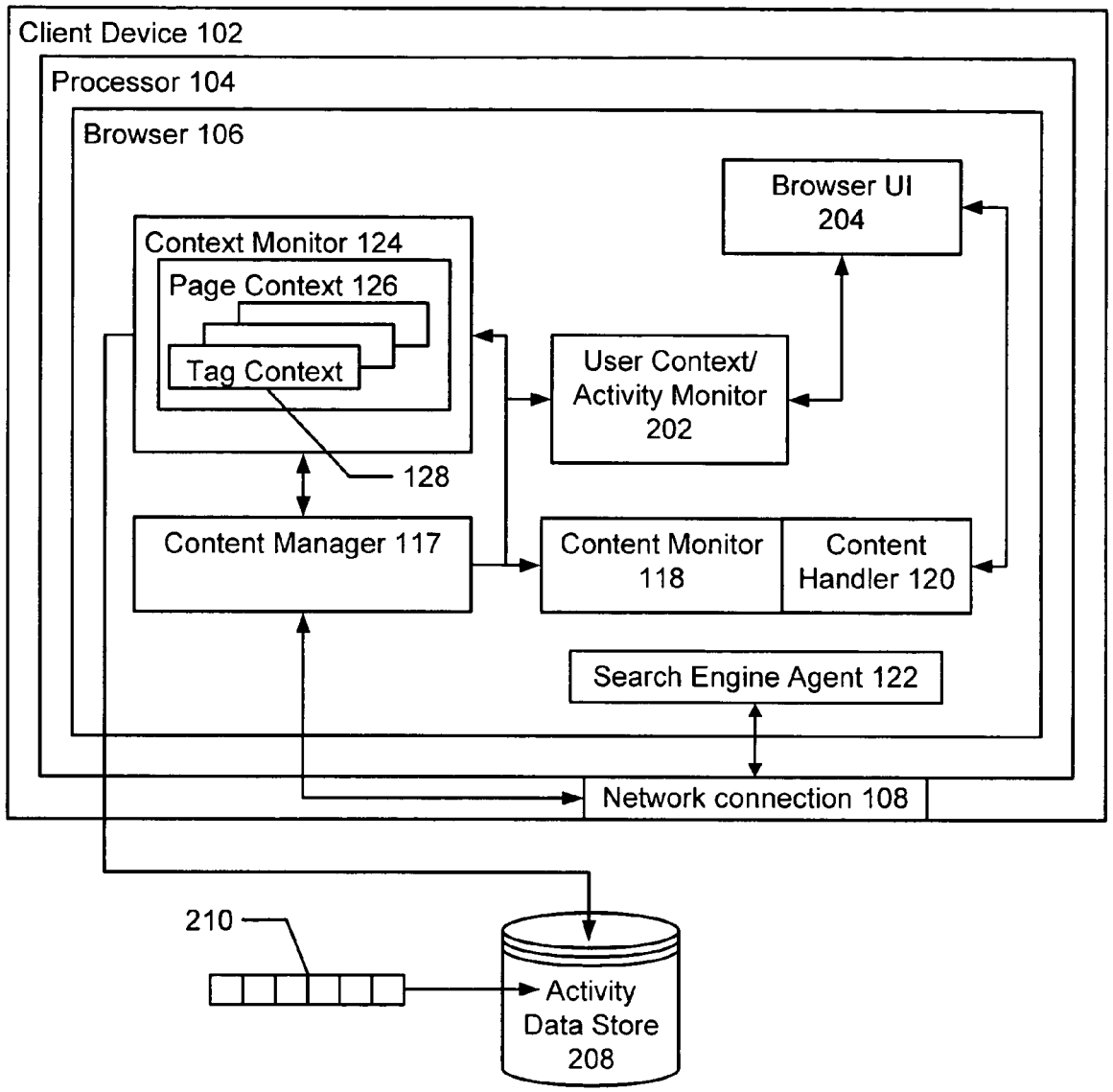
FIG. 2 depicts an arrangement of a preferred embodiment for tracking user activity related to network resources and for associating that activity with the recorded content/contextual information for those resources.

FIG. 2 depicts an arrangement 200 of a preferred embodiment for tracking user activity related to network resources and for associating that activity with the indexed content/contextual information for those resources. For clarity, the server 110 and database 123 of the system 100 shown in FIG. 1 are not depicted in the arrangement 200, and only a single content monitor/content handler 118/120 pair is depicted in the browser 106. Nevertheless, it will be understood that the absent components can be included in the arrangement 200, and function as described above in conjunction with the system 100.

According to the preferred embodiment, the browser 106 is provided with a user context/activity monitor 202 for monitoring and recording user activity taken with respect a network resource included or referred to in the browser 106. As used herein, the term "user activity" may include both user input and user-initiated activities in the browser 106 and the corresponding results of those inputs/activities. The context/activity monitor 202 is configured to gather and record activities related to the network resource including a history of the activities and the times that the activities start, stop, or have elapsed. The context/activity monitor 202 is further configured to record concurrent activities, such as activities occurring in a browser window or tab not directly associated with the network resource, and activities that occur in a sequence with the detected user-initiated activity. Thus, the context/activity monitor 202 monitors user activity within the browser 106 and associates the activity with the network resource and any resulting content. In the preferred embodiment the context/activity 202 monitor interacts with the context monitor 124 to record user activity and to relate it to the content and contextual information discovered by the content monitor 118 and context monitor 124 in order to discover further contextual information.

The user activity, i.e., the user's browser input collected by the user context/activity monitor 202, and the content/contextual information gathered and indexed using the content manager 117, the context monitor 124, and the content monitors 118 cannot be discovered by servers. For example, assume that the user of client device 102 is browsing images. The server 110 can detect when a particular image is requested and retrieved by the browser 106, but the server 106 does not know whether the user instructs the browser 106 to save the image to a disk, or if the user right clicks on the image displayed in the browser 106 and selects an option "send to" from a menu to e-mail the image. Monitoring such user activity and associating the activity with the image can be used to determine whether certain type of images have more significance than others to that user. The same goes for other types of content, such as movies and pages. The context/activity monitor 202 can be used to determine not only the page being viewed, but also where the user clicks within the page, and if it is a long page, where is the user spends the majority of the time. By discovering this contextual information in the browser using the context/activity monitor 202 and the content monitors 118, the user activity information is gathered on the client-side, and then made available to the server 110 to be used for intelligent uses, such as context-sensitive searches or for marketing purposes.

In the case of searches performed by the server 110, the user activity and indexed content and contextual information can be used during the searches to provide contextual searches and to improve search results. The user activity and indexed content and contextual information may also be sent to a server and combined with the context and activity data of multiple users for marketing or group analysis. Whether or not a user of client device 102 generates a search index, the user may generate a context-sensitive search by sending search criteria to the server 110 over a network 115, such as the Internet. The server 110 receives the search criteria through a network connection 114. The search criteria typically includes one or more keywords that, in the case of a context-sensitive search, may include contextual information. Examples of contextual information are presented above.

The server 110 may then search its databases or indexes (which may be located on the client device 102) for one or more objects that match the search criteria. The results of the search (identifiers of the one or more matching objects and/or the objects themselves) may then be transmitted to the user through the client device 102.

Server 110 may include a processor 112 running a search engine 116 and interfacing an index engine 119, a context engine 125, and a sort/rank engine 129. The server 110 may include a database 123, or the database 123 may be external to the server 110, or located in the client device 102. Database 123 includes keyword indices 121 and context tables 127.

To rank the results of the search, in another embodiment of the invention, the server 110, prior to transmission to the user, may receive ranking criteria from the user or apply customized ranking criteria to the search results. Examples of ranking criteria may include the number of accesses to each object by users with certain criteria (for example, by users living in the same area as the requesting user, or users who share the same interests as the requesting user where the requesting user's interests are determined based on the user's past behavior detected in the browser, or users who download predominantly JPEG files), or the number of users having accessed the object in the past (which may be different from the number of links to a site with the keyword), and so on. Ranking is typically done by the server 110, but may be done by the client device 102.

Figures 3, 4:
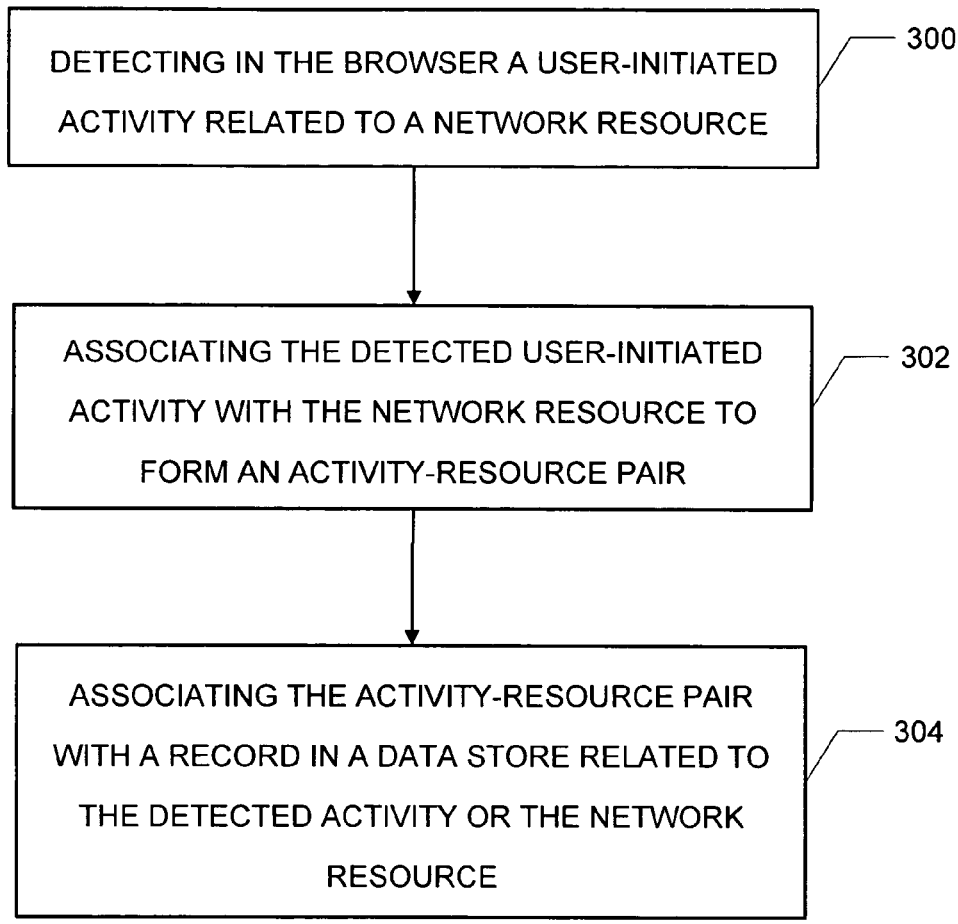
FIG. 3 is a flow diagram illustrating a process performed by the arrangement depicted in FIG. 2 in accordance with a preferred embodiment of the present invention.
FIG. 4 is diagram illustrating an exemplary activity record included in an activity data store used in conjunction with the arrangement shown in FIG. 2.

FIG. 3 is a flow diagram illustrating a process performed by the arrangement 200 depicted in FIG. 2 in accordance with a preferred embodiment of the present invention. The process begins in step 300 by detecting in the browser a user-initiated activity related to a network resource. In a preferred embodiment, each detected activity is assigned an activity ID, and any identifiers, such as URIs or URLs, associated with the network resource and results of the activity are determined. In step 302, the detected user-initiated activity is associated with the network resource to form an activity-resource pair. For example, the context/activity monitor 202 can associate a URI/URL identifying the network resource with the activity ID of the detected activity, creating a URL/activity ID pair(s).

In step 304, the activity-resource pair is associated with a record in a data store related to the detected activity or the network resource. For example, the URL/activity ID pair(s) described above can be stored in an activity record(s) 210 of an activity data store 208, as shown in FIG. 2. The activity/context monitor 202 can associate the URL/activity ID pair with records in the activity data store 208 that relate to the network resource or to the detected activity. By separately associating the activity-resource pair with records in the data store 208 that relate to the network resource and/or the detected activity, the information in the data store 208 can be used to add context to users' browsing activities that is unavailable with conventional browser technology. Moreover, the information in the data store 208 can be combined with the indexed content and contextual information provided by the content monitor 118 and context monitor 124 and then mined to provide further insight in users' browsing activities.

FIG. 4 is diagram illustrating an exemplary activity record 210 included in the activity data store 208. The activity record 210 can include a URL/URI field 400, an activity ID field 402, a history reference field 404, a summary statistics field 406, and a session statistics field 408. The URL/URI field 400 contains the URL or URI of the network resource. The activity ID field 402 contains the activity ID that identifies the user-initiated activity. The history reference field 404 contains a reference to a history log associated with the URL or URI and the detected activity. The history log can be stored in a separate table of the data store 208. The summary statistics field 406 contains usage statistics related to the network resource and the activity over a user-definable lifetime of use of resource or detection of the activity. The session statistics field 408 contains usage statistics associated with the network resource or activity that occurred during a most-recent or current browser session. The summary statistics field 406 and the session statistics field 408 are preferably implemented as several fields, rather than a single field.

The activity data store 208 may be partitioned to include an activity index portion and an activity history portion. The context/activity monitor 202 can be configured to store indexed content and context data related to a network resource in the activity index portion, and to log individual activities related to the network resource in the activity history portion of the data store 208. Summary and session statistics can be stored in the activity index portion, but optionally can be calculated on demand from the data in the activity history portion. A combination of these methods can be used to limit the size of the history that needs to be maintained.

According to an exemplary embodiment, the context/activity monitor 202 can update the history log, summary statistics, and session statistics associated with the activity record 210. The context/activity monitor 202 can also report the history and/or statistics to the server 110 in a case of a search engine, as requested or configured. In the preferred embodiment updating and reporting are performed through the context monitor 124.

The functionality of the context/activity monitor 202 may be implemented in several ways. Referring again to FIG. 2, in a preferred embodiment, the browser user interface (UI) 204 provides a subscription interface that allows the context/activity monitor 202 to detect user-initiated activities by subscribing to browser events that correspond to the activities. In this embodiment, the browser UI 204 is responsible for sending events to browser component subscribers at appropriate times. The browser UI 204 can be used in conjunction with a library/input subsystem (not shown) of an operating system of the client device 102 to abstract the user-initiated activities into button events, such as a close window command, a select menu item, a scroll command, a save as command, a print command, and the like, and to send these events to subscribers such as the user context/activity monitor 202. The browser application also invokes code that implements the requested activities.

Each event processed by the context/activity monitor 202 provides the context/activity monitor 202 with information related to the user-initiated activity and the network resource (e.g., the URL/URI). The activity ID (that identifies the activity) can either be provided to the context/activity monitor 202 as data associated with each event data provided by the browser UI 204 or can be assigned by the context/activity monitor 202 based on data associated with each event. In addition, each event can provide other parameters and/or information related to a result of the activity. The context/activity monitor 202 processes the information associated with each event and associates the URL/URI of the network resource, and optionally the content/context related to the network resource, with the activity ID of the command that the browser 106 invoked to form the activity-resource pair. As the context/activity monitor 202 processes each event, the activity record 210 is stored/updated in the data store 208 and statistics are generated as described below.

The context/activity monitor 202, in conjunction with the content monitor 118, and context monitor 124, can also record other information depending on the detected user-initiated activity. For example, in the case of the user initiating a "send to" command, the context/activity monitor 202 can record not only that an image was sent to someone, but also to whom it was sent. Many activities/commands have parameters, and the context/activity monitor 202 from the received events can determine and record the values of the parameters for a current activity. This type of design would allow configuration settings in the browser to determine which activities are to be tracked and for which resources records are to be made. This implementation can require the cooperation of the browser 106 and/or browser plug-in developers to be implemented.

In a second embodiment, the context/activity monitor 202 can be configured to act as an interceptor. The interceptor design pattern is well-known in the art of programming with design patterns, and is outside the scope of this disclosure. With such an arrangement, the context/activity monitor 202 can be configured to detect/intercept user-initiated activity from the browser UI 204. The context/activity monitor 202, acting as an interceptor, can determine the network resource(s) by identifying the active content associated with the activity, and in particular, by determining the page or page element having focus. The context/activity monitor 202 can then associate the detected activity(ies) with an identify of the network resource to form the activity-resource pair. Depending on the design of the browser 106, multiple interceptors may have to be placed at more than one location in the browser architecture to monitor all relevant data.

A final embodiment is one where the functionality of the context/activity monitor 202 is tightly integrated into each piece of code in the browser 106 through an API provided by the context/activity monitor 202. This embodiment is similar to the method many programs use to record data in an event log. That is, various components must be instrumented to call the context/activity monitor 202 directly to provide it with the information it needs. While this embodiment is not a preferred arrangement, as it requires that numerous portions of the browser code be separately modified to instrument the monitoring function, the arrangement can be used to perform the operations described above.

Examples of the type of user activity that the user context/activity monitor 202, in conjunction with the content monitor 118 and context monitor 124, may be configured to track and associate with network resources in accordance with a preferred embodiment include the following:

1. For links (URLs):
    a. Sequence of links followed (i.e. a link trail).
    b. Was a link opened in new window/tab?
    c. Were link properties viewed?
    d. Was a link copied, saved, or bookmarked? Objects that are bookmarked including grouped or tabbed bookmarks (e.g., via MOZILLA and FIREFOX browsers) or objects that are viewed in a group of tabs imply some relationship among the objects as far as the user is concerned. The pattern and repetition of these relationships detected over a group of users can indicate that the objects should be returned together in a search or given similar ranking.
2. For flash objects, determining whether the object is:
    a. Zoomed;
    b. Played;
    c. Looped;
    d. Rewound; or
    e. Printed
3. Pages viewed concurrently in multiple windows and/or tabs. Note: this is dynamic so views of a set of pages can be timed, intersections of such sets can be taken to detect common pages among sets, etc.
4. Bookmarks, including: a rate of change, folder structure and content of the bookmarks.
5. To indicate a trust level for a given site or page:
    a. Are cookies allowed? (persistently or by session). What cookie, popup, scripting policies are enforced by the browser on a per page or per domain basis? This type of data can be used to lower the importance or rank of associated objects. For example, images from a site where a high percentage of browsers are set to block cookies or block images or animation are images that users likely have low interest in.
    b. Are scripts allowed?
    c. Are pop-ups allowed?
    d. Are ads blocked?
6. For a given image, determining whether the image:
    a. Was resized on the client;
    b. Was viewed separate from its surrounding page;
    c. Was downloaded;
    d. Was manipulated by plug-ins;
    e. Was sent via instant messaging (IM) or emailed (to whom);
    f. Was set as background;
    g. Properties were viewed.

7. For pages, determining:
   a. How it was reached (typed in location bar, via a link, back/forward button, bookmark, history, reloaded, etc.);
   b. Whether it was loaded into a page editor;
   c. Whether the page source was viewed and/or saved;
   d. Whether the page metadata was viewed;
   e. Whether the page privacy policy was viewed;
   f. Whether the page security was viewed;
   g. Which links on a page were followed;
   h. What text searches were executed on a page or across a set of pages;
   i. Text that was zoomed; or
   j. Whether a page was cached for offline use.
8. Objects edited. An edited object implies an object that has been used.
9. Saved data for auto fill-in of form pages, such as a username, a password, or an address.
10. Files that are downloaded. When the user downloads an image from the browser, this information is used as an indication that the image has value to the user. When such activity is reported to a server, counting these downloads across a number of users provides data that can be used to value specific pictures and thus rank them. Tracking the specific images downloaded by a specific user enables a profile to be created which can predict the user's interests. This information can be used in ranking search results for the specific user.
11. Printed objects. Objects that the user prints through the browser, such as pages, files, images, portions of pages, and the like, can be identified and categorized.
12. Objects emailed directly from the browser to another user.
13. Separate pages/objects viewed simultaneously (e.g., in multiple browser windows or tabs). Objects, such as images, that are viewed in a group of tabs imply some relationship among the images as far as the user is concerned. The pattern and repetition of these relationships detected over a group of users can indicate that they should be returned together in a search or given a similar ranking.

In both sets of examples, data can be partitioned on a per browser session basis (e.g. from invocation of the browser to the close) or across an entire lifetime of browser use. Further the data can be used across a group or population of users or can be used to create a profile for specific users.

According to the preferred embodiment, a browser 106 is provided for monitoring user activity and for providing additional metadata about the content that is browsed by the browser. This provides several advantages, especially if the record of the user activity data gathered on the client device 102 is made available to the server 110, as the server 110 is provided with a view of not only what the user is browsing, but also what is being done with the content once received using the browser. With conventional server-side techniques, usage statistics gathering can be more implicit and less complete, mostly tracking that a user has visited a site and perhaps how the user navigated there. In addition, with conventional techniques, the user activity data can be gathered without knowing anything personal about the user, and/or can be gathered without the user providing preference data in terms of wants/needs and likes/dislikes. With the client-side techniques described here, the activity data can be used with personal data and preferences as well as other search filtering and ranking techniques.

The following are examples of information where the user activity data can be gathered in a more comprehensive manner than can be gathered from a server or family of servers:

1. Browsing history and patterns across unrelated sites (i.e., sites that don't share usage statistics). This data allows one to detect browsing patterns of individuals and populations. For example, if it is detected that a significant number of users purchase online prints after downloading and saving an image, a site can react by making ordering of prints easy immediately after an image download. Detecting a high rate for home printing for certain types of images would allow a search engine to advertise printing, framing, and services for searches that return similar types of images.

2. Subjects of interest across unrelated sites. The advantages of having this type of data are similar to those describe in the paragraph above.

3. eCommerce activity across unrelated sites, including responses to advertising across unrelated sites. The record of user activity can track user activity for any site visited, allowing for cross-site analysis techniques to be applied. For example, browsers often have more than one browser window open at a time. With the present invention, it can be determined that visitors of AMAZON may be looking for the same item on EBAY, which is determined by monitoring user activity, which cannot be determined on the server-side. As another example, if a commonly observed pattern among users is to buy a computer at DELL, buy software at AMAZON, and buy peripherals at PCCONNECTION, then three sites could be ranked high in the paid advertising for searches related to PC's (e.g., "PC ratings" keyword search). The three sites could also do cross promotion and share revenue.

A system and method for tracking user activity information related to network resources using a browser has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for tracking user activity information related to network resources using a browser, comprising:
   detecting in a browser on a client device a user-initiated activity taken by a user related to a network resource;
   associating the detected user-initiated activity with the network resource to form an activity-resource pair;
   associating the activity-resource pair with a record in a data store related to the detected activity or the network resource;
   creating a user profile, on the client device, the user profile specific to the user associated with the activity-resource pair;
   parsing content related to the network resource to determine content information including at least one of mime type, author, and creation date; and
   indexing, by the browser, at least one of the content information and contextual information related to the network resource, wherein the contextual information is not inherent to the content.

2. The method of claim 1 further comprising: monitoring and recording user activities related to the network resource, including at least one of a history of those activities, a time that the activities start, stop, or have elapsed, and concurrent activities, including at least one of activities occurring in a different browser window or tab and activities that occur sequentially.

3. The method of claim 1 further comprising: reporting at least a portion of data derived from or included in the data store to a server on a network to provide contextual information for searches related to the activity or the network resource.

4. The method of claim 1 further comprising: reporting at least a portion of data derived from or included in the data store to a server on a network for combining the portion of data with data of multiple users for performing marketing analysis related to the activity or the network resource.

5. The method of claim 1 further comprising: updating one or more of a history log, summary statistics, and session statistics associated with the data store record.

6. The method of claim 1 further comprising determining contextual information based on relationships included in at least one of the indexed content and contextual information.

7. The method of claim 1 further comprising: providing the browser with an application program interface (API) that allows a context/activity monitor to detect the user-initiated activity by subscribing to a browser event corresponding to the activity.

8. The method of claim 1 wherein the detected user-initiated activity includes a browsing history across unrelated sites that do not share usage statistics.

9. The method of claim 1, comprising: determining a result of the detected user-initiated activity related to the network resource associated the event.

10. The method of claim 1 further comprising: configuring a context/activity monitor to act as an activity interceptor that detects a browser event corresponding to the user-initiated activity, determines the network resource by identifying active browser content through determining a browser page or page element having focus, and assigns the activity ID to the detected activity.

11. The method of claim 1, comprising: configuring a browser code module tasked with performing the user-initiated activity to determine the network resource by identifying active browser content through determining a browser page or page element having focus, associate the detected user-initiated activity with the network resource to form an activity-resource pair, and associate the activity-resource pair with the data store record.

12. A client device for tracking user activity information related to network resources, comprising:
a browser for providing access to a network resource; and
a context/activity monitor associated with the browser to detect a user-initiated activity related to the network resource and for associating the user-initiated activity with the network resource to form an activity-resource pair;
wherein the context/activity monitor is configured to associate the activity-resource pair with a record included in the data store related to at least one of the network resource and the detected activity and to create a user profile, on the client device, the user profile specific to the user associated with the activity-resource pair and to parse content related to the network resource to determine content information including at least one of mime type, author, and creation date and to index, by the browser, at least one of the content information and contextual information related to the network resource, wherein the contextual information is not inherent to the content.

13. The client device of claim 12 wherein the context/activity monitor is configured to update one or more of a history log, summary statistics, and session statistics associated with the data store record.

14. The client device of claim 12 wherein the browser includes one or more content handlers for parsing and displaying data associated with the network resource.

15. The client device of claim 12 wherein the context/activity monitor is configured to monitor and record at least one of user activities related to the network resource, including at least one of a history of the activities and a time that the activities start, stop, or have elapsed, and concurrent user activities, including at least one of activities occurring in a browser window or tab not directly associated with the network resource and activities that occur in a sequence with the detected user-initiated activity.

16. The client device of claim 15 wherein the context/activity monitor is configured to determine an activity ID that identifies the user-initiated activity and to associate the activity ID with the network resource to form the activity-resource pair.

17. The client device of claim 16 wherein the browser includes an API that allows the context/activity monitor to detect the user-initiated activity by subscribing to a browser event corresponding to the activity.

18. The client device of claim 16 wherein in response to the context/activity monitor receiving an event, determining an identify of the user-initiated activity and the network resource associated with the event.

19. The client device of claim 18, wherein the event is associated with a result of the detected user-initiated activity related to the network resource.

20. The client device of claim 16 wherein the context/activity monitor is configured to act as an activity interceptor that detects user-initiated activity, determines the network resource by identifying active browser content through determining a browser page or page element having focus, and assigns the activity ID to the detected activity.

21. The client device of claim 12 wherein the browser further includes:
a content manager for routing content including the network resource and associated metadata to appropriate content handlers;
one or more content monitors coupled between the content manager and corresponding content handlers for determining content and contextual data related to the network resources; and
a context monitor coupled to the content manager and/or the content monitors that receives data from the content manager and/or content monitors for determining contextual data from relationships among the content, the metadata, and the network resource.

22. The client device of claim 21 wherein the contextual relationships related to the network resource include any combination of: other resources received in the browser before or after the network resource is received, attributes of other resources arranged near the network resource in the browser, attributes of mark-up language tags that include the network resource, attributes of links to additional metadata associated with the network resource, attributes of a user of the browser, identifiers of other resources linked to the network resource, and information indicating that content information related to the network resource comes from a title or heading in the browser.

23. The client device of claim 21 wherein the content monitor is configured to create an index for indexing content and/or contextual information related to the network resource and to transmit the index to a server on the network.

24. The client device of claim 23 wherein user activity and the contextual information are sent to the server along with the index to provide contextual searches related to the activity or the network resource.

25. The client device of claim 23 wherein user activity and the contextual information are sent to the server along with the index and are combined with the context and activity data of multiple users for performing marketing analysis related to the activity or the network resource.

26. A computer-readable medium containing programming instructions for, when executed by a processor, tracking user activity information in a browser, the program instructions for:
   detecting in a browser a user-initiated activity taken by a user related to a network resource;
   associating the detected user-initiated activity with the network resource to form an activity-resource pair;
   associating the activity-resource pair with a record in a data store related to the detected activity or the network resource;
   creating a user profile, on the client device, the user profile specific to the user associated with the activity-resource pair; and parsing content related to the network resource to determine content information including at least one of mime type, author, and creation date; and
   indexing, by the browser, at least one of the content information and contextual information related to the network resource, wherein the contextual information not inherent to the content.

27. The computer-readable medium of claim 26 further comprising program instructions for: updating one or more of a history log, summary statistics, and session statistics associated with the data store record.

28. The computer-readable medium of claim 26 further comprising program instructions for: monitoring and recording user activities related to the network resource, including at least one of a history of those activities, a time that the activities start, stop, or have elapsed, and concurrent activities, including at least one of activities occurring in a different browser window or tab and activities that occur sequentially.

29. The computer-readable medium of claim 26 further comprising program instructions for: reporting at least a portion of data derived from or included in the data store to a server on a network to provide contextual information for searches related to the activity or the network resource.

30. The computer-readable medium of claim 26 further comprising program instructions for: reporting at least a portion of data derived from or included in the data store to a server on a network for combining the portion of data with data of multiple users for performing marketing analysis related to the activity or the network resource.

31. The computer-readable medium of claim 26 wherein the program instructions for detecting the user-initiated activity further comprise instructions for: determining an activity ID that identifies the user-initiated event.

32. The computer-readable medium of claim 31 further comprising program instructions for: including in the data store record a universal resource indicator (URI) field for storing a URI corresponding to the network resource, an activity ID field for storing the activity ID that identifies the user-initiated activity, a history reference field for storing a reference to a history log associated with the activity and the network resource, a summary statistics field for storing usage statistics related to the network resource and the activity over a lifetime of the use of the activity or network resource, and a session statistics field for storing usage statistics related to the network resource and the activity that occurred during a current browser session.

33. The computer-readable medium of claim 31 further comprising program instructions for: providing the browser with a context/activity monitor for associating the activity ID of the detected user-initiated activity with the network resource to form the activity-resource pair and for associating the activity-resource pair with the data store record.

34. The computer-readable medium of claim 33 further comprising program instructions for: providing the browser with an application program interface (API) that allows the context/activity monitor to detect the user-initiated activity by subscribing to a browser event corresponding to the activity.

35. The computer-readable medium of claim 34 further comprising program instructions for: in response to the context/activity monitor receiving an event, determining an identity of the user-initiated activity and the network resource corresponding to the event.

36. The computer-readable medium of claim 35 further comprising program instructions for: determining a result of the detected user-initiated activity related to the network resource corresponding to the event.

37. The computer-readable medium of claim 33 further comprising program instructions for: configuring the context/activity monitor to act as an activity interceptor that detects a browser event corresponding to the user-initiated activity, determines the network resource by identifying active browser content through determining a browser page or page element having focus, and assigns the activity ID to the detected activity.

38. The computer-readable medium of claim 26 further comprising program instructions for: configuring a browser code module tasked with performing the user-initiated activity to determine the network resource by identifying active browser content through determining a browser page or page element having focus, associate the detected user-initiated activity with the network resource to form an activity-resource pair, and associate the activity-resource pair with the data store record.

* * * * *

UNITED STATES PATENT AND TRADEMARK OFFICE
CERTIFICATE OF CORRECTION

PATENT NO. : 7,631,007 B2  Page 1 of 1
APPLICATION NO. : 11/104972
DATED : December 8, 2009
INVENTOR(S) : Robert P. Morris It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Second Day of November, 2010

David J. Kappos
*Director of the United States Patent and Trademark Office*